United States Patent
Edelman

[15] 3,683,501
[45] Aug. 15, 1972

[54] ADAPTER FOR DENTAL IMPLANTS

[72] Inventor: Alfred E. Edelman, 2723 Federal St., Camden, N.J. 08105

[22] Filed: Feb. 12, 1971

[21] Appl. No.: 114,766

[52] U.S. Cl. .................................................32/10 A
[51] Int. Cl. ............................................A61c 13/00
[58] Field of Search.....................................32/10 A

[56] References Cited

UNITED STATES PATENTS 2,721,387  10/1955  Ashuckian.................32/10 A

Primary Examiner—Robert Peshock
Attorney—Munson H. Lane and Munson H. Lane, Jr.

[57] ABSTRACT

A casing which is of a size and shape to encase an undersized dental implant for the purpose of adapting the undersized dental implant to fit an enlarged opening in a jaw bone.

20 Claims, 11 Drawing Figures

Patented Aug. 15, 1972

INVENTOR
ALFRED E. EDELMAN

BY  *Munson H. Lane*

ATTORNEY

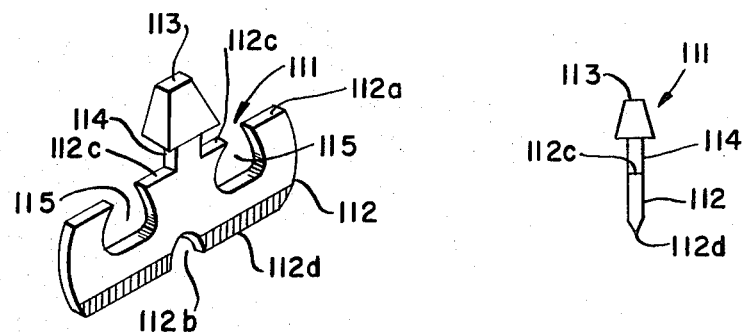
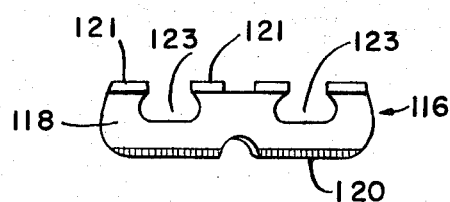
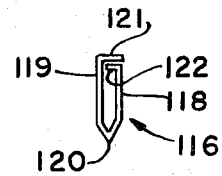
FIG. 7.   FIG. 8.
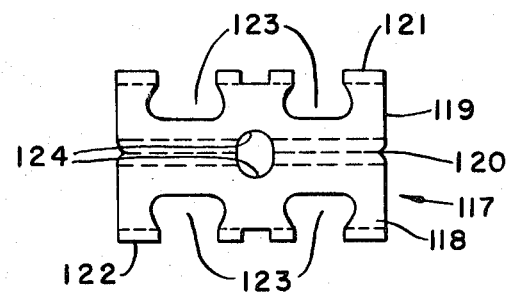
FIG. 9.   FIG. 10.
FIG. 11.
INVENTOR
ALFRED E. EDELMAN
BY Munson H. Gane
ATTORNEY

ADAPTER FOR DENTAL IMPLANTS

The invention relates to an adapter for encasing a selected size dental implant for the purpose of filling an opening in the jaw bone which is larger than the selected dental implant.

Wide blade dental implants have been previously disclosed in the pending U.S. Pat. application Ser. No. 804,738 filed Feb. 24, 1969 in the names of Leonard I. Linkow and Alfred E. Edelman. While this invention may be used in combination with the wide blade dental implants disclosed in the aforesaid pending patent application, the adapter of this invention may be made of a size and shape to fit other types of dental implants.

It is an object of this invention to provide an adapter to encase a dental implant which is undersized with respect to an opening in the jaw bone, so that the encased implant will tightly fill the opening.

It is another object of this invention to provide an adapter which is simple in construction, economical to manufacture and can be formed from a thin blank of sheet material to the desired shape for encasing the wide blade implants. The adapter may be made from non-corrosive materials, such as stainless steel or synthetic resinous materials.

These and other objects, advantages and novel features will be apparent from the following description and the accompanying drawing wherein:

FIG. 7 is a perspective view in enlarged scale of a modified dental implant adapted to be encased within a slightly modified form of the invention;

FIG. 8 is an end view of the dental implant shown in FIG. 7;

FIG. 9 is a front elevational view of a modified casing adapted to encase the dental implant shown in FIG. 7;

FIG. 10 is a left hand end view of the casing shown in FIG. 9;

FIG. 11 is a top plan view of a blank from which the casing shown in FIGS. 9 and 10 is made.

Figure 1:
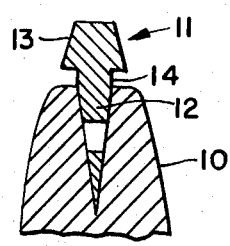
FIG. 1 is a transverse vertical sectional view taken through a human jaw bone showing a wide vent blade of an appropriate size to fill an opening in the jaw bone.
Figure 2:
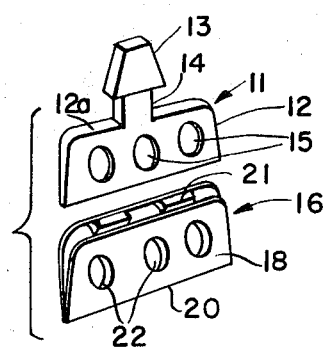
FIG. 2 is a perspective view showing a wide vent blade superimposed above one form of the adapter of this invention and about to be inserted therein.

Referring to FIG. 1 a human jaw 10 is shown in vertical cross section having a wide blade dental implant 11 implanted in the jaw bone in a normal manner. The implant 11 as seen in FIG. 2 includes a wide, wedge shaped blade portion 12 and a head portion 13 integrally connected to the blade portion 12 by a narrow neck 14. The blade portion 12 is normally implanted in the jaw with the neck and head portion protruding from the bone. Openings 15 are provided in the blade portion 12 for the purpose of allowing bone material to grow through the openings so as to interlock with the blade portion 12. The openings 13 are sometimes referred to as vents hence the terms vent blades or wide vent blades have been applied to the implants 11. The head portion 13 provides means to which dental appliances can be secured. When the wide vent blade is to be inserted in the jaw it is normally placed on the ridge of the jaw in vertical alignment with the jaw bone and driven into the bone by hammer blows or by continuous pressure applied to the head portion of the wide vent.

Wide blade dental implants as normally manufactured are limited to certain standard thicknesses so that a dentist does not have available to him a wide selection of implants of different thicknesses. It sometimes happens that the opening in the jaw bone becomes enlarged so that the bone will not tightly hold a wide blade implant of a standard thickness. Should such a condition occur it would be necessary to remove the implant and replace it with an implant of a larger size if the larger size implant were available. However since the larger size wide blade implants may not be available, it is the purpose of this invention to provide an adapter 16 as shown in FIG. 2 which will encase the implant of smaller size than the jaw opening so that the encased implant when inserted in the jaw opening will be tightly held therein.

Figure 6:
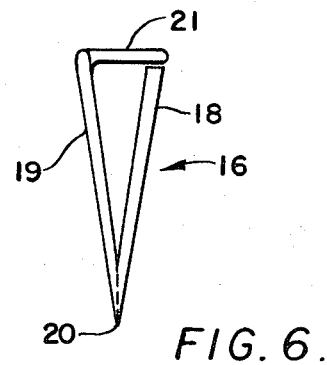
FIG. 6 is an enlarged left end view of the adapter shown at the bottom of FIG. 2 but in closed position.

The adapters of this invention can be designed of a size and shape to tightly encase wide blade dental implants of different configurations. As there are many possible sizes and shapes for the wide blade dental implants, there are likewise many possible sizes and shapes for the adapter. For the wide blade dental implant shown in FIG. 2 the adapter 16 is of wedge shaped end configuration as shown by the left hand end view of the adapter 16 shown in FIG. 6. The adapter 16 is folded from a blank 17 of sheet material, for example of non-corrosive metal, to have opposing side walls 18 and 19 diverging from a bottom fold line 20. Spaced tabs 21 which are integrally connected to the marginal edge of the side wall 19 opposite the fold line 20 are folded inwardly to provide a top closure for the adapter. Apertures 22 are provided in the side walls 18 and 19 of the adapter so as to be in alignment with the apertures 15 of the implant 11 when the implant is encased within the adapter. The material from which the adapter is made will generally be of sufficient resiliency so that the side walls 18 and 19 may be spread apart (after the adapter is formed into the shape shown in FIG. 6) sufficiently to admit the insertion of the wide blade implant 11. After the implant is inserted in the adapter, the side walls 18 and 19 will spring back toward each other to closely engage opposite side walls of the implant blade portion 12 and the tabs 21 will overlie the upper shoulders 12a of the blade portion 12 on opposite sides of the neck 14.

Figure 3:
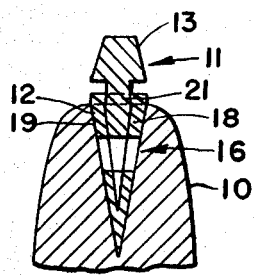
FIG. 3 is a transverse vertical sectional view through a human jaw bone showing a wide vent blade and adapter filling the opening in the jaw bone.

Once the implant 11 has been encased in the adapter 16 in the manner described, the encased implant will then be forced into the opening in the jaw bone until it is situated in the manner illustrated in FIG. 3. The thickness of the adapter side walls 18 and 19 in addition to the thickness of the implant blade portion 12 will normally be sufficient to tightly fill an opening previously formed for the implant and in which the implant alone has worked loose.

Figure 5:
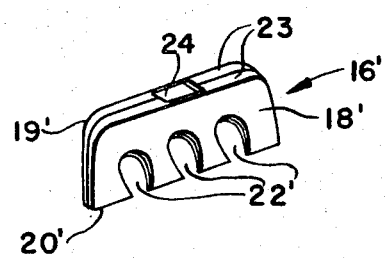
FIG. 5 is a perspective view of another form of the invention.

FIG. 5 shows a modified adapter 16' having a configuration which would fit a wide blade implant having apertures extending into the blade of the implant from the bottom edge thereof. The adapter 16' will therefore have apertures 22' in opposite side walls 18' and 19' which extend upwardly from the bottom edge 20' of the adapter 16'.

Adapters can also be designed for circular or other types of dental implants that fall under the same category of being undersized for the opening afforded or available in the bone.

It is within the scope of this invention that top closures of different types can be provided for the adapter. Instead of tabs 21 as shown in FIGS. 2, 3, 4 and 6 an inturned flange may be provided on one or both side walls of the adapter to provide closures for the top and ends of the adapter. FIG. 5 illustrates the form of adapter having inturned flanges 23 extending along the marginal edges of the side walls 18' and 19'. The flanges 23 are provided with cut-out portions to form an opening 24 adapted to receive the implant neck 14. The flanges 23 come together along a line 25 which would overlie a median line through the shoulders of the blade portion of the implant.

Figure 4:
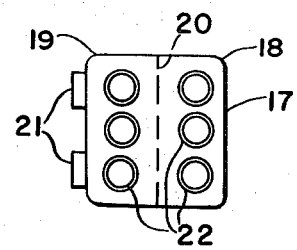
FIG. 4 is a top plan view showing a pre-cut blank from which the invention is formed.

It is within the scope of this invention that the adapters can be formed in various ways, and it is not intended to limit the invention to the formation of adapters from sheet material as shown in FIG. 4. The adapters can be made from any metals or plastics that are non-corrosive and acceptable to the body and are adaptable to the formation of a closely fitting casing for a loose fitting wide blade implant. The adapters may be molded casings or may be folded from sheet material as previously described.

In FIGS. 7 and 8 a modified dental implant 111 is shown which may be encased in the adapter 116 shown in FIGS. 9 and 10.

The dental implant 111 has a blade portion 112 and a head portion 113 connected to the blade portion 112 by a narrow neck 114. The implant 111 is distinguished from the dental implant 11 (shown in FIG. 2) by having apertures or notches 115 formed in the top margin 112a of the blade portion 112 and extending downwardly into the body of the blade portion, and by an aperture 112b extending into the blade 112 from the sharpened bottom edge 112d along the vertical center line of the implant. Shoulder portions 112c extending outwardly from the neck 114 over the apertures 115 are provided to block the ingress of the gum tissue into the apertures 115; however bone material can grow into the apertures from the sides of the implant. The apertures 115 and 112b are provided for the purpose of allowing bone material to grow therein and to interlock with the implant blade portion in order to stabilize the dental implant in the jaw. It is important to block the entrance of gum tissue into the apertures 115 in order to prevent irritation and possible infection of the gum.

In situations where the implant 111 becomes loose in the jaw, or is undersized for whatever reasons, an adapter 116 can be used to encase the implant 111 to enlarge it.

The adapter 116 comprises substantially straight side walls 118 and 119 which are bent inwardly along their bottom margins to form a bevelled connecting edge 120 and overlapping tabs 121 and 122 extending inwardly from the upper margins of the side walls 119 and 118 respectively. Two pair of oppositely aligned apertures 123 are provided in the side walls 118 and 119 along their upper margins to correspond with the apertures 115 of the implant 111. A pair of oppositely aligned apertures 124 are provided in the side walls 118 and 119 adjacent their connecting edge 120 to correspond with the aperture 112b in the dental implant 111. The adapter 116 is preferably formed from a blank of sheet material such as illustrated in FIG. 11, by folding the side walls upwardly about the bottom edge 120 until they are parallel, and folding in the tabs 122 and 123 until they are approximately perpendicular to the respective side wall to which they are integrally connected.

The implant 111 fits within the adapter 116 so that the apertures 123 are aligned with corresponding apertures 115 of the implant and so that the apertures 124 are aligned with the aperture 112b of the implant. Tabs 121 overlie tabs 122 and they each overlie shoulder portions of the implant 111. The tabs bracketing the neck 114 prevent lateral movement of the implant within the adapter as well as vertical shifting of the implant within the adapter. The adapter is made from material sufficiently resilient to permit the side walls 118 and 119 to be spread apart to allow insertion of the implant within the adapter.

What is claimed is:

1. The combination comprising a dental implant having a base portion for implanting in an enlarged opening in the jaw bone and a head portion connected to said base portion so that said head portion will project outwardly from the jaw bone when said base portion is implanted in said opening, and adapter means for encasing the base portion of said dental implant so that the encased base portion will tightly fill said opening, said adapter means comprising a hollow casing having an interior cavity of substantially the same size and shape as said base portion, means permitting opening of said casing whereby said base portion may be removably inserted into the interior cavity of said casing.

2. The combination set forth in claim 1 wherein said base portion is a blade having openings therein to permit the growth of bone material in interlocking relationship with said implant, and wherein said adapter has corresponding openings therein which are aligned with the openings in the blade when the blade is encased in said adapter.

3. The combination set forth in claim 2 wherein said blade and said casing are wedge shaped.

4. An adapter for use with an undersized dental implant for adapting the undersized dental implant to fill an enlarged opening in a jaw bone, said implant having a base portion for implanting in the jaw bone and a head portion connected to said base portion, said adapter comprising a casing for the base portion of said implant, said casing having an interior cavity of substantially the same size and configuration as said base portion and of external dimensions sufficient to tightly fill said enlarged opening.

5. The adapter set forth in claim 4 wherein said adapter is wedge shaped and comprises a pair of diverging side walls which are integrally connected at the apex of said wedge and means bridging said side walls along the edges of said side walls opposite said apex.

6. The adapter set forth in claim 5 wherein oppositely aligned apertures are provided in said side walls.

7. The adapter set forth in claim 6 wherein said apertures extend upwardly from said apex.

8. The adapter set forth in claim 5 wherein said bridging means comprises a pair of spaced tabs extending inwardly from the marginal edge of one side wall opposite said apex.

9. The adapter set forth in claim 5 wherein said bridging means comprises an inturned flange extending along at least the marginal edge of at least one of said side walls opposite said apex, and said flange is provided with an opening adapted to fit around a protruding neck portion of a dental implant.

10. The adapter set forth in claim 9 wherein each side wall is provided with an inturned flange.

11. The adapter set forth in claim 4 wherein said casing includes a pair of opposite side walls which are integrally joined along one edge.

12. The adapter set forth in claim 11 wherein said casing is made of material sufficiently resilient to permit said side walls to be spread apart for insertion of the base portion of the dental implant, without exceeding the elastic limit of said material so that the side walls will closely engage the dental implant.

13. The adapter set forth in claim 11 wherein said adapter has apertures extending through said casing walls at locations such that the apertures of the casing will align with corresponding apertures in an apertured dental implant which the adapter is designed to encase.

14. The adapter set forth in claim 13 wherein said apertures extend inwardly from a marginal edge of said side walls opposite said one edge along which the side walls are integrally joined toward said one edge.

15. The combination comprising a dental implant having a horizontally elongated blade portion which is defined by a bottom marginal edge, a top marginal edge and a pair of end marginal edges connecting the bottom marginal edge with said top marginal edge, a head portion, a neck portion integrally joining said head portion to said blade portion along said upper marginal edge, and openings within said blade portion to permit the growth of bone material in interlocking relationship with said implant and an adapter comprising a casing which has a hollow interior of substantially the same size and configuration as said blade portion to encase said blade portion and said casing has openings therein which are aligned with the openings in the blade portion of said implant when the blade portion of the implant is encased in the adapter.

16. The combination set forth in claim 15 wherein said openings in said implant include at least one opening which interrupts said upper marginal edge on one side of said neck and extends downwardly toward said bottom edge.

17. The combination set forth in claim 16 wherein the upper marginal edge of said blade portion includes a shoulder extending laterally from said neck so as to partially close said one opening along said marginal edge.

18. The combination set forth in claim 15 wherein there is a second opening similar to said one opening provided in said blade portion on the opposite side of said neck from said one opening.

19. The combination set forth in claim 18 wherein said dental implant is symmetrically shaped about a vertical center line extending through said neck portion.

20. The combination set forth in claim 19 wherein there is a notch provided in said blade portion along said bottom edge and said adapter includes a corresponding notch.

* * * * *